(12) United States Patent
Andresen et al.

(10) Patent No.: US 7,774,896 B2
(45) Date of Patent: Aug. 17, 2010

(54) BACKPACK SUCTION/BLOWER APPARATUS

(75) Inventors: Erik Andresen, Stuttgart (DE); Markus Herzog, Weinstadt (DE); Jürgen Häberlein, Murrhardt (DE); Jörg Amann, Besigheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 1070 days.

(21) Appl. No.: 11/338,671

(22) Filed: Jan. 25, 2006

(65) Prior Publication Data
US 2006/0162116 A1 Jul. 27, 2006

(30) Foreign Application Priority Data
Jan. 25, 2005 (DE) .................. 10 2005 003 275

(51) Int. Cl.
*A47L 5/14* (2006.01)
(52) U.S. Cl. .................. 15/326; 15/330; 15/327.5
(58) Field of Classification Search ............. 15/326, 15/330, 345, 327.5
See application file for complete search history.

(56) References Cited

U.S. PATENT DOCUMENTS

| | | | |
|---|---|---|---|
| 6,305,048 B1 * | 10/2001 | Salisian ............ | 15/326 |
| 7,077,078 B2 * | 7/2006 | Yuasa et al. ........ | 123/41.7 |
| 2001/0005918 A1 * | 7/2001 | Miyamoto ........... | 15/326 |

\* cited by examiner

*Primary Examiner*—Dung Van Nguyen
(74) *Attorney, Agent, or Firm*—Walter Ottesen

(57) ABSTRACT

A backpack suction/blower apparatus has a blower unit (1) which includes a drive motor (2), a blower (3), which is driven by the drive motor (2), and a blower tube (4) extending from the blower (3). A back carrier frame (5) is provided on which the blower unit (1) is attached at a spacing while forming an intake gap (6). The intake gap (6) is filled with a foam attenuating element (8) in the lateral direction (7) referred to the usual working position.

19 Claims, 4 Drawing Sheets

BACKPACK SUCTION/BLOWER APPARATUS

CROSS REFERENCE TO RELATED APPLICATION

This application claims priority of German patent application no. 10 2005 003 275.3, filed Jan. 25, 2005, the entire content of which is incorporated herein by reference.

BACKGROUND OF THE INVENTION

Backpack suction/blower apparatus are used in park grounds, public green areas, private gardens and the like to blow leaves together or away. A blower is driven by a drive motor configured especially as an internal combustion engine. The blower pushes an air flow through a blower tube which is guided by an operator. The blower tube is directed toward the ground surface to be worked and the air flow to blow leaves together or the like can be directed in a desired manner.

Suitable suction/blower apparatus include a blower unit in which a blower is mounted with a blower tube as well as a drive motor for the blower. The blower tube is connected to the blower and is guided out of the apparatus. The blower unit is mounted on a back carrier frame as part of the suction/blower apparatus. The entire unit can be carried ergonomically favorably by an operator during the work procedure on the back by means of the back carrier frame. An intake opening of the blower unit faces toward the back of the operator, that is, a corresponding back plate of the back carrier frame. For an unhindered induction of air, a spacing is provided in the region of the intake opening between the blower unit and the back carrier frame. This spacing forms, at least approximately, an all-around intake gap in the elevation and lateral directions.

The operation of a suction/blower apparatus in the above-mentioned embodiment can lead to a considerable development of noise. This noise can reach an unwanted high level especially when the apparatus is used in populated areas.

SUMMARY OF THE INVENTION

It is an object of the invention to provide a backpack suction/blower apparatus which is so improved that a reduced noise level occurs during operation.

The backpack suction/blower apparatus of the invention is carried by an operator in a usual work position when the suction/blower apparatus is in operational use. The suction/blower apparatus includes: a blower unit including a drive motor, a blower driven by the drive motor and a blower tube extending out from the blower unit; a back carrier frame; means for supporting the blower unit on the frame at a spacing therefrom to form an intake gap; and, the intake gap being filled with a sound attenuating element in a lateral direction referred to the usual work position.

A backpack suction/blower apparatus is provided wherein the intake gap is filled with a sound attenuating or sound deadening element in a lateral direction referred to the usual work position. The invention is based on the realization that a significant part of the total noise development can be assigned to the intake side of the blower unit. The arrangement of a sound attenuating element in at least one lateral direction (preferably in both lateral directions) effectively prevents a sound radiation out of the intake region, that is, the intake gap in the lateral direction. The intake gap is only clear upwardly and/or downwardly whereby a sound radiation takes place primarily upwardly and/or downwardly while maintaining an adequate intake cross section. The sound radiation downwardly in the direction of the ground or upwardly passes persons standing to the side or passes structures which are located laterally. An effective sound attenuation is obtained in the lateral direction. In total, a reduced noise load to the ambient results.

In an advantageous further embodiment, the above-mentioned sound attenuating element is held form tight. A form-tight holding in the lateral direction by means of a lattice is provided. In the counter direction, that is, inwardly into the intake gap, it has been practical to provide a form-tight clamping holding by means of holding clamps, projections, holding angles and/or the like which project from the lattice. The sound attenuating element is preferably held clamped between these elements and the lattice. In a direction lying transverse to the plane of the intake gap, the sound attenuating element is held clamped by means of a housing edge. The above-mentioned arrangement has proven to be an effective sound attenuating measure in the context of a lightweight construction and easy assembly.

In a practical further embodiment of the invention, the intake gap is lined with a further sound attenuating element on the back plate of the back carrier frame on the side facing toward the blower unit. A sound component is radiated off from the intake region of the blower unit in the direction of the back plate. The arrangement is based on the recognition that this sound component can already be effectively attenuated or deadened when impinging against the opposite-lying back plate of the back carrier frame before entering the intake gap toward the ambient. A reduced sound level impinges upon the sound attenuating element arranged laterally in the intake gap. This sound level is further reduced by means of the lateral sound attenuating elements.

The above-mentioned sound attenuating element is preferably attached form tight to the back plate, especially on the lattice and/or intake lattice, and is held clamped advantageously by means of holding clamps, projections, holding angles and/or the like. A high sound attenuation effect is noticeable while facilitating assembly.

In a preferred embodiment, pins are provided in the region of the holding angles and these pins project from the back plate and the sound attenuating element is pushed onto these pins. The pins prevent a slippage of the sound attenuating element in its plane and therefore a slipping out of the holding angles.

In a practical variation, the sound attenuating element includes a sound protective cone on the back plate. This sound protective cone leads into an intake opening of the blower. The conical shape forms an aerodynamically-formed guide of the intake air flow into the intake opening. The interaction of the conical shape and a reduced turbulence of the intake air flow as well as the sound absorption characteristic contribute to a further reduction of the sound level. The turbulence is reduced because of the aerodynamic guidance.

Preferably, an especially clampingly held sound attenuating element is provided within an engine hood. To aid assembly, a small quantity of adhesive can be provided which effects a fixing of the planar plate material in the arched engine hood. The plate material is especially elastic. After the assembly, the sound attenuating element is clamped form tight toward the outside by the engine hood and toward the inside by additional components such as by an air guidance hood. A high sound attenuating effect is obtained with a simple configuration and easy assembly.

As a further effective sound attenuating measure, an embodiment is advantageously provided wherein the blower tube has a radially widened section whereat a further sound attenuating element is held form tight. The further sound attenuating element is held in the blower tube and is configured as an elastic cylinder which can be pressed into the expanded section. The cylinder itself is preferably made of a bent plate material, which is connected along a seam, and is especially welded or glued. The elastic material characteristics permit a simple assembly in that the sound attenuating element is pressed together and is introduced into the blower tube where it unfolds automatically in the expanded section and is thereby reliably secured. The connection or welding at the seam prevents a slippage during the assembly operation.

In an advantageous further embodiment, at least one of the above-mentioned sound attenuating elements and preferably all of the above-mentioned sound attenuating elements are formed of a sound attenuating, especially open pore plastic foam. This plastic foam is preferably a PUR foam. The total weight is important for a portable work apparatus. With respect to the total weight, the above-mentioned material has proven to be a good compromise between weight and sound attenuating effect. The open pores in combination with a lattice attachment in the lateral intake gap can, in addition, permit at least a part induction via the sound attenuating element.

In a practical embodiment, a further sound attenuating element (especially of melamine resin foam) is provided in the spatial region of an exhaust-gas muffler of the drive motor. The sound radiation of the exhaust-gas muffler in the direction of the intake gap is partially attenuated. The melamine resin foam can function also as a thermal insulation of the exhaust-gas muffler which is hot during operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
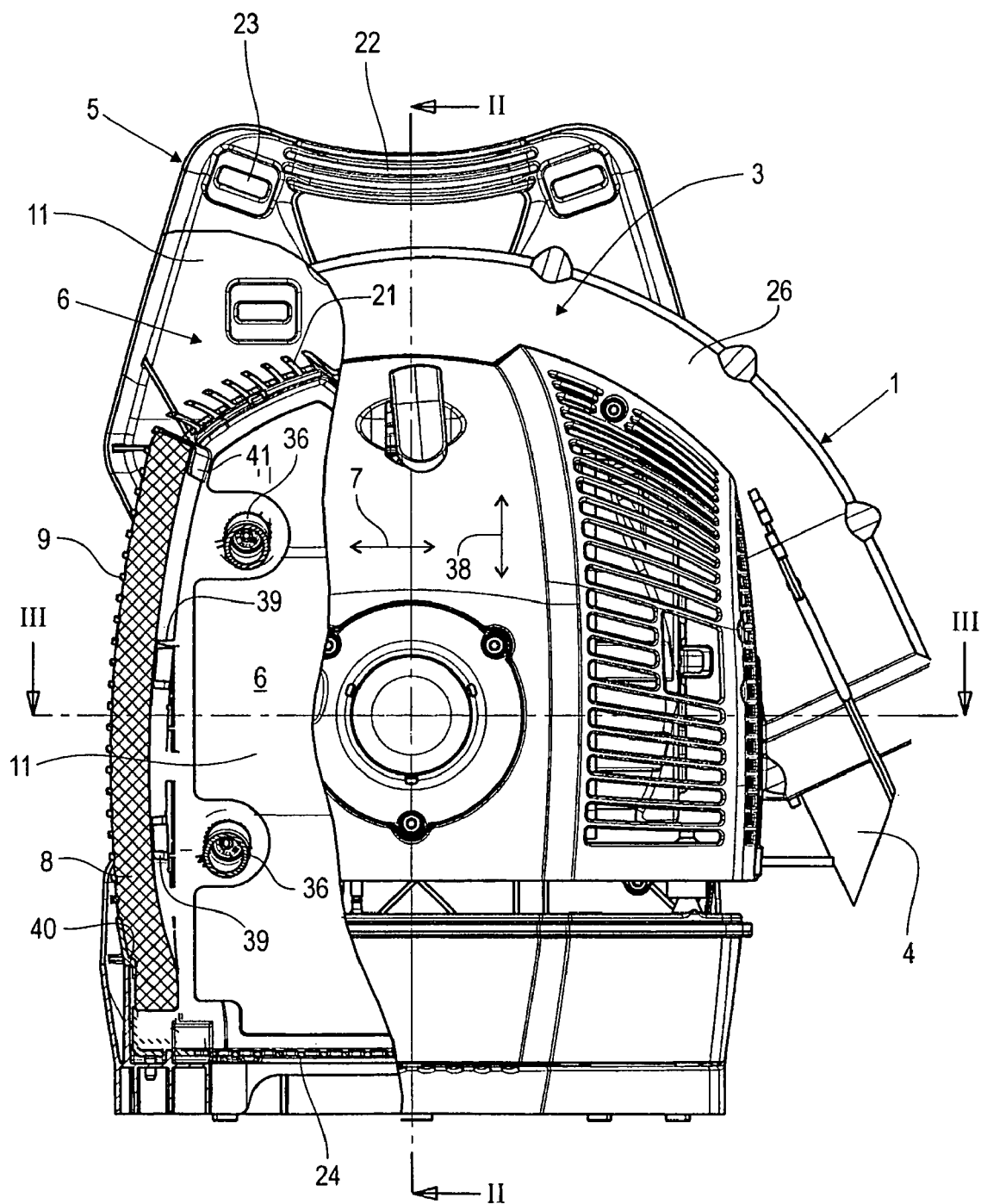
FIG. 1 is a front elevation view, partially in section, of a backpack suction/blower apparatus showing details with respect to a lateral sound attenuation element in the intake gap.

FIG. 1 shows a suction/blower apparatus in a front elevation view which is partially in section. The suction/blower apparatus includes a blower unit 1 and a back carrier frame 5. The suction/blower apparatus is shown in its usual working and operating position wherein it is carried with the back carrier frame 5 on the back of an operator. Referred to the usual work position shown, a lateral direction is characterized by the double arrow 7 and an elevation direction is characterized by the double arrow 38.

The back carrier frame 5 includes a back plate 11 which extends upwardly into a carrier handle 22 having side belt openings 23 for a carrying belt.

Figure 2:
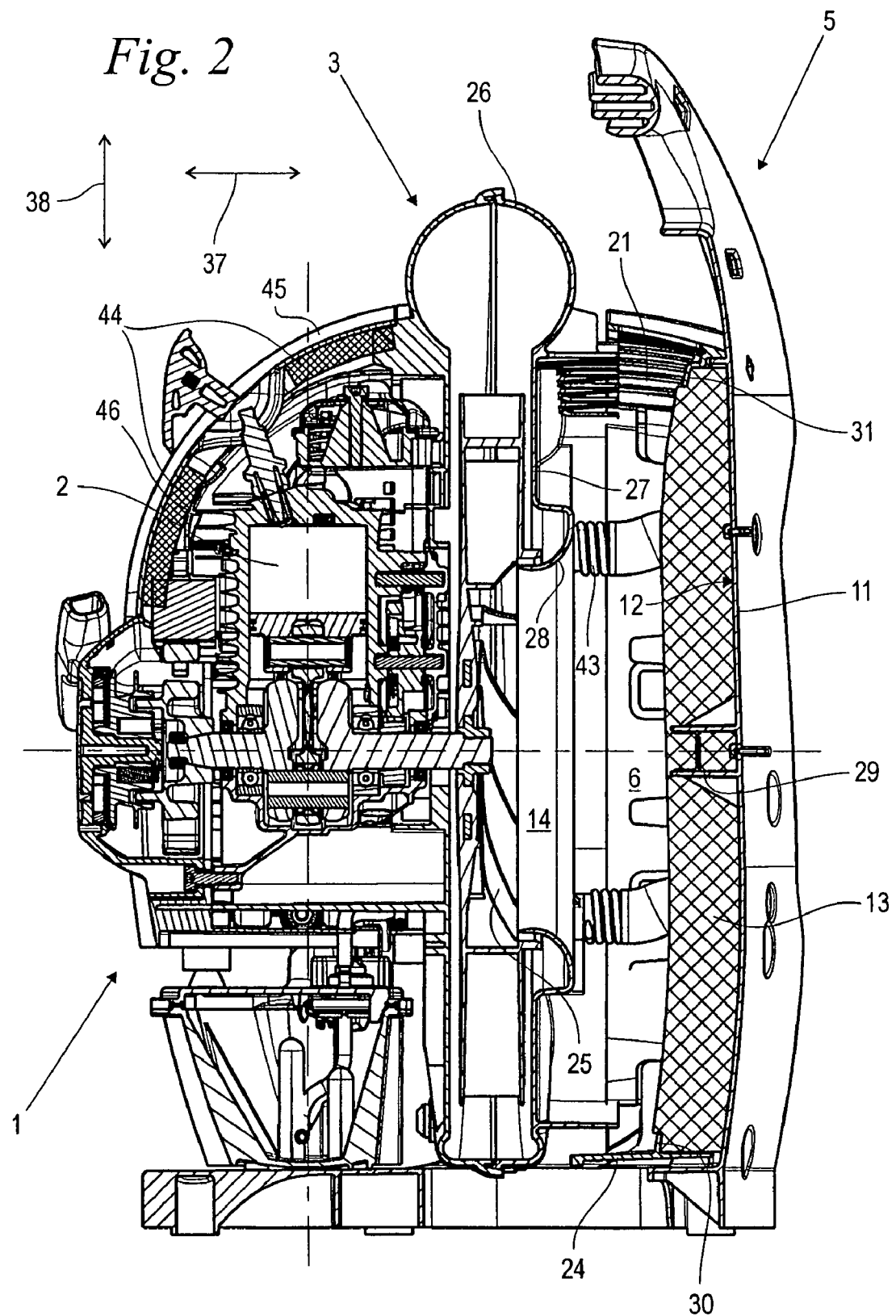
FIG. 2 is a longitudinal section view of the suction/blower apparatus of FIG. 1 viewed in the direction of section line II-II of FIG. 1 and shows additional sound attenuation arranged on the back carrier frame.

The blower unit 1 includes a drive motor 2 and a blower 3 which are both shown in greater detail in FIG. 2. The drive motor 2 drives the blower 3 to generate a blower air flow which is directed out by means of a blower spiral 26 and a blower tube 4 extending therefrom.

The blower unit 1 is attached by means of antivibration elements 43 (FIG. 2) to attachment points 36 of the back carrier frame 5. A spacing is provided between the blower unit 1 and the back carrier frame 5. This spacing lies in a longitudinal direction identified by a double arrow 37 shown in FIG. 2 and lies transversely to the lateral direction 7 and the elevation direction 38. Because of the spacing, an intake gap 6 is formed between the blower unit 1 and the back carrier frame 5. The intake gap 6 runs in a plane spanned by the lateral direction 7 and the elevation direction 38.

The intake gap 6 is covered all around by an upper intake lattice 21, a lower intake lattice 24 as well as by lattices 9 on both sides, respectively. The two lateral lattices 9 run approximately completely over the total elevation direction of the intake gap 6. The elevation direction is given by the double arrow 38 and only the left lateral lattice 9 is shown in the partially sectioned view of FIG. 1. The intake gap 6 is closed over the entire elevation of the two lateral lattices 9 in the lateral direction 7 of the intake gap 6 with respective sound attenuating elements 8. The two sound attenuating elements 8 are held form tight on the back carrier frame 5 in that they are supported toward the outside by means of assigned lattices 9 and inwardly by means of a number of holding clamps 39 and holding angles 41 which project out of the lattice 9 and are clampingly held between these holding clamps and holding angles and the lattice 9 in the lateral direction 7. In the lower region of the lattice 9, an edge 40 is formed which presses into the sound attenuating element 8. The edge 40 and the holding angle 41 hold the sound attenuating element 8 in the elevation direction 38.

In operation, the blower unit 1 draws in an intake air flow through the intake gap 6. The intake air flow runs essentially through the upper intake lattice 21 and the lower intake lattice 24. The noise development associated therewith from the interior of the intake gap 6 effects a sound output in essentially the elevation direction 38 via the upper intake lattice 21 and the lower intake lattice 24. A sound output in the lateral direction 7 is attenuated by means of the sound attenuating elements 8.

FIG. 2 shows the apparatus of FIG. 1 in longitudinal section taken along line II-II of FIG. 1. It is noted that a spacing runs between a back wall 27 of the blower unit 1 and the back plate 11 of the back carrier frame 5 while forming the intake gap 6. The spacing is bridged by antivibration elements 43 via which the blower unit 1 is vibration-decouplingly attached to the back carrier frame 5. An intake opening 14 is formed in the back wall 27 and is delimited by a peripherally-extending aerodynamically rounded edge 28. In the center of the blower spiral 26, a blower wheel 25 is arranged which, together with the blower spiral 26, forms the blower 3 in the form of a radial blower. FIG. 2 shows that the blower wheel 25 is driven by means of a drive motor 2 configured as a two-stroke piston engine.

The back plate 11 has an inner side 12 which faces toward the back wall 27 and/or to the intake gap 6. The back plate 11 of the back carrier frame 5 is lined on its inner side 12 over its entire area with a sound attenuating element 13. This area covers the intake gap 6 and is delimited by the intake lattices (21, 24) and/or the lattices 9 (FIG. 1). The sound attenuating element 13 is attached form tight to the back plate 11 in that it is held clamped on a holding clamp 29 as well as projections 30 and holding angles 31. The central holding clamp 29 is formed on the back plate 11 while the projections 30 and holding angles 31 are formed onto the lower or upper intake lattices (21, 24). The lateral lattices 9 (FIG. 3) also have holding angles 42 for attaching the sound attenuating element 13. Additionally, or alternatively to the form-tight clamped holding, the sound attenuating element 13 can be secured to the back plate 11 utilizing an adhesive.

The sound attenuating element 13 lies in the plane of the intake gap 6 without completely filling the gap with the plane of the intake gap 6 being spanned in the elevation direction 38 and the lateral direction 7 (FIG. 1). Rather, the thickness of the sound attenuating element 13, which lies in the longitudinal direction 37, is so selected that an adequately wide intake gap 6 remains between the sound attenuating element 13 and the back wall 27. During operation, an intake air flow enters through the intake lattices (21, 24) into the intake gap 6 and runs there between the back wall 27 and the sound attenuating element 13 until it enters into the intake opening 14 along the aerodynamically rounded edge 28. A sound level, which exits from the intake opening 14, impinges to a considerable part against the opposite-lying sound attenuating element 13 where it is effectively attenuated. A remaining residual sound level is further attenuated in the lateral direction 7 by the lateral sound attenuating elements 8 (FIG. 1).

The drive motor 2 is covered toward the outside by an engine hood 45. An air guidance hood 46 lies between the engine hood 45 and a cylinder of the drive motor and functions to guide the cooling air about the cylinder. A plate-shaped sound attenuating element 44 is arranged within the engine hood 45 and is held clamped between the engine hood and the air guidance hood 46. Additionally, a position fixation of the sound attenuating element 44 is provided with respect to the engine hood 45 and/or the air guidance hood 46 by means of a small quantity of adhesive as an aid to assembly. The sound attenuating element 44, which is produced as a plate-shaped raw material, is elastically deformed against the inner contour of the engine hood 45.

Figure 3:
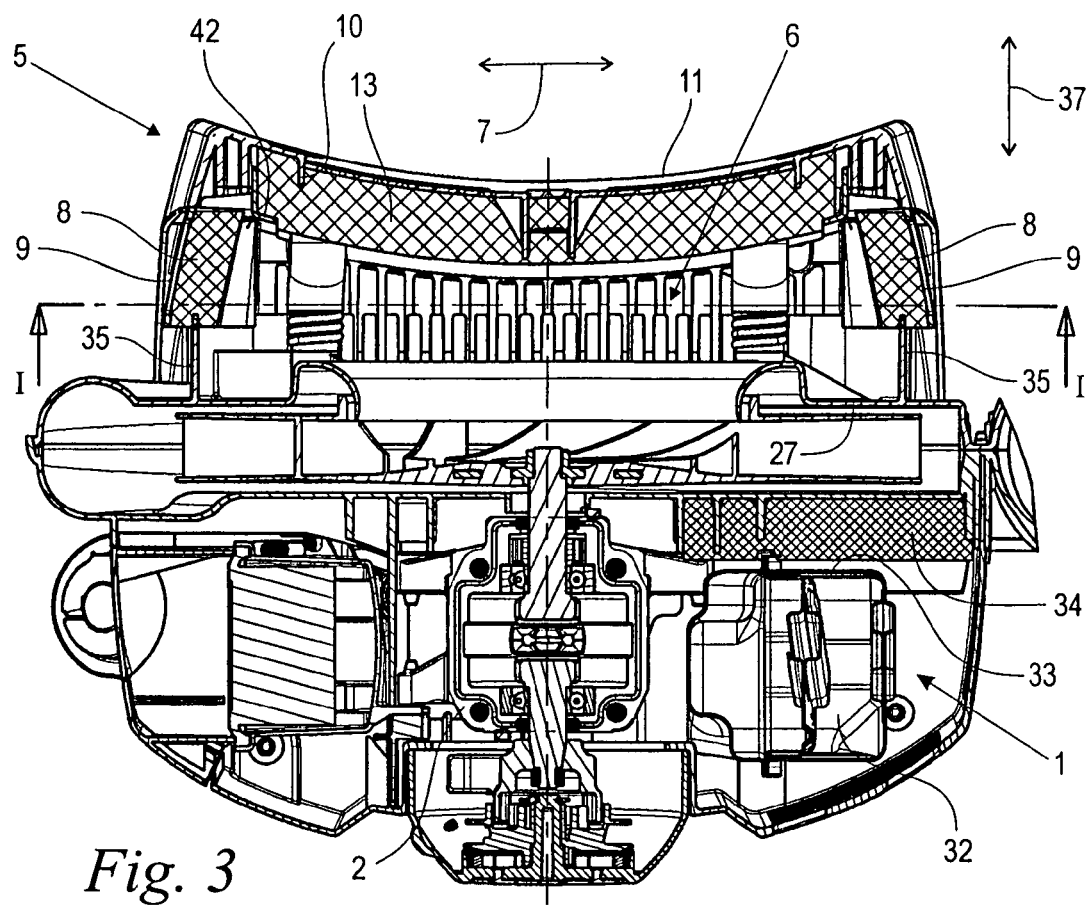
FIG. 3 is a transverse section view of the suction/blower apparatus of FIG. 1 viewed along line III-III of FIG. 1 showing additional details of the mutual relative arrangement of the sound attenuating elements and the form-tight attachment.

FIG. 3 shows a cross section of the apparatus of FIGS. 1 and 2 and is taken along line III-III of FIG. 1. The cross-sectional view shows that the lateral edges of the sound attenuating element 13 are held in holding angles 42. The sound attenuating element 13 is form fitted against the arcuate back plate 11. The holding angles 42 are formed as one piece on the lateral lattices 9. Pins 10 project in the longitudinal direction 37 from the back plate 11 in the immediate vicinity of the holding angles 42. The sound attenuating element 13 is pressed onto the pins 10 in the region of its lateral edges whereby a fixation of the lateral edges is given in the lateral direction 7 and a slippage out of the holding angles 42 is prevented.

FIG. 3 also shows that the two lateral sound attenuating elements 8 lie in the lateral direction 7 symmetrically opposite each other and form, together with the rearward sound attenuating element 13, an approximately closed U-shaped encapsulation of the intake gap 6 in the lateral direction 7 and in the longitudinal direction 37.

Housing edges 35 project in the longitudinal direction 37 from the back wall 27 of the blower unit 1. The housing edges 35 run in the elevation direction 38 (FIG. 1) over the elevation of the sound attenuating element 8 and lie under pretension against the associated lateral sound attenuating elements 8. The housing edges 35 press into the sound attenuating elements 8 and hold the elements 8 form tight on the back carrier frame 5 in the longitudinal direction 37. An arrangement can also be practical wherein the lateral sound attenuating elements 8 as well as the lateral lattices 9 are part of the lower unit. Corresponding means on the back carrier frame 5 hold the sound attenuating elements 8 against the blower unit 1.

The drive motor 2 includes an exhaust-gas muffler 32. In the spatial region of the exhaust-gas muffler 32, a further sound attenuating element 34 is mounted on the outer side 33 of the muffler 32 in the direction of the back wall 27 and/or in the direction of the back carrier frame 5. In the embodiment shown, the sound attenuating element 34 is formed out of a thermally resistant, sound attenuating and laminated melamine resin foam and is held form tight by corresponding clamps or the like or clamped in the blower unit 1.

Figure 4:
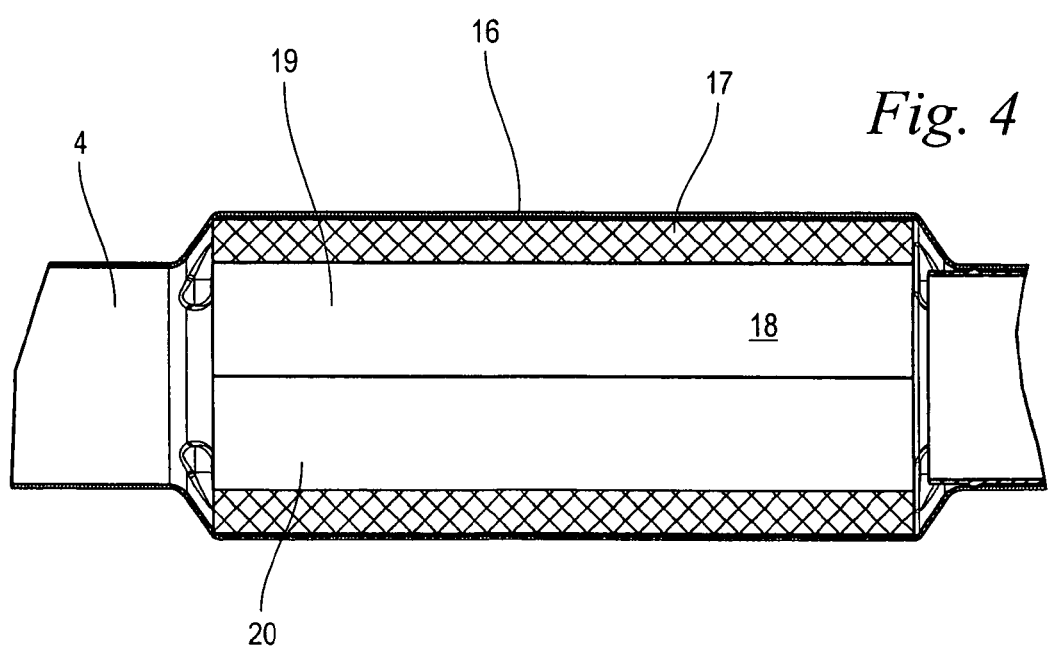
FIG. 4 is a longitudinal section showing details of the blower tube of the blower unit having a cylindrical sound attenuating element formed of two half shells; and, FIG. 5 is a variation of the arrangement of FIG. 2 having a sound protective cone projecting into the intake opening.

FIG. 4 shows a section of the blower tube 4 of FIG. 1 in a longitudinal section view. The blower tube 4 is provided with a radially expanded section 16 over a portion running in the longitudinal direction. In this expanded section 16, a further sound attenuating element 17 is held form tight. The sound attenuating element 17 is configured as an elastic cylinder 18 which can be pressed into the expanded section 16. The cylinder 18 is formed from a bent plate material 20 connected along a seam 19 and especially welded. The plate material can also be glued at the seam 19. For assembly, the cylinder 18 is introduced in the deformed state through the blower tube 4 into the expanded section 16 where it automatically relaxes and adapts to the contour of the expanded section 16. In the relaxed state, the cylinder 18 has a diameter excess compared to the expanded section 16 whereby a clamped holding is provided. There can also be two half shells separated from each other or connected to each other which can be assembled as a construction unit or individually. In lieu of the cylindrical configuration of the blower tube 4 provided here and in lieu of the radially expanded section 16, an oval cross section, for example, having a corresponding configuration of the additional sound attenuating element 17 can be practical. The oval cross section departs from the transverse cross section.

Figure 5:
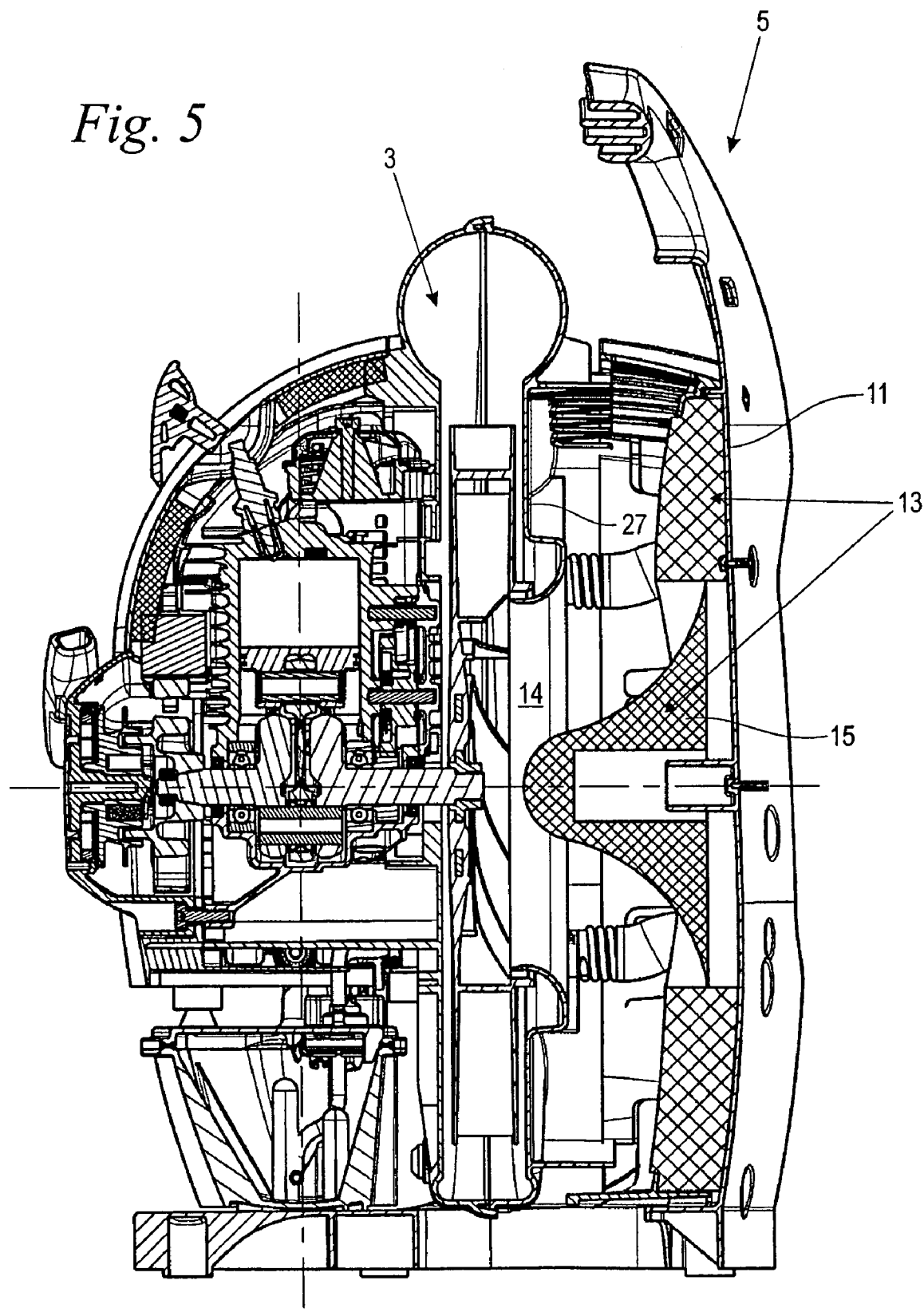

FIG. 5 shows a variation of the apparatus of FIG. 2. Here, the rearward sound attenuating element 13 is configured as two parts and is arranged on the back plate 11 of the back carrier frame 5. A plate-shaped part of the sound attenuating element 13 is provided centrally with an approximately circularly-shaped cutout wherein a sound protective cone 15 is seated as an additional part of the sound attenuating element 13. The sound protective cone 15 is attached with adhesive to the back plate 11 but can, however, also be attached via clamps, holding angles or the like. The sound protective cone 15 projects into the intake opening 14 of the back wall 27. Its rotationally symmetrical contour shown in longitudinal section is aerodynamically rounded and conducts the intake air flow while avoiding turbulences into the intake opening 14 of the blower 3. With respect to other features, the embodiment of FIG. 5 corresponds to the embodiment of FIGS. 1 to 4.

With reference to FIGS. 1 to 5, the sound attenuating elements (8, 13, 17, 44) as well as the sound protective cone 15 are formed of a sound attenuating foam which is especially open pore plastic foam. In the embodiment shown, the foam is an open pore PUR (polyurethane) foam. The sound attenuating elements (8, 13, 17, 44) are cut from a planar plate-shaped raw material. The planar plate material 20 of open pore PUR foam is bent elastically to the cylinder 18 for forming sound attenuating element 17 and welded at the seam 19. The foam material of the elastic cylinder 18 can advantageously be laminated on its inner side.

It is understood that the foregoing description is that of the preferred embodiments of the invention and that various changes and modifications may be made thereto without departing from the spirit and scope of the invention as defined in the appended claims.

What is claimed is:

1. A backpack suction/blower apparatus carried by an operator in a usual work position when said suction/blower apparatus is in operational use, said suction/blower apparatus comprising:

a blower unit including a drive motor, a blower driven by said drive motor and a blower tube extending out from said blower unit;
a back carrier frame;
means for supporting said blower unit on said frame at a spacing therefrom to form an intake gap;
said intake gap being filled with a sound attenuating element in a lateral direction referred to said usual work position; and,
a lattice for form-tight holding said sound attenuating element in a lateral direction toward the outside.

2. The backpack suction/blower apparatus of claim 1, further comprising holders arranged on said lattice for holding clamped said sound attenuating element inwardly in said lateral direction.

3. The backpack suction/blower apparatus of claim 2, wherein said holders are holding clamps, edges and/or holding angles; and, said sound attenuating element is clamped between said holders and said lattice.

4. The backpack suction/blower apparatus of claim 1, wherein said intake gap defines a plane; said blower unit includes a housing defining a housing edge; and, said sound attenuating element is held by said housing edge in a direction transverse to said plane.

5. The backpack suction/blower apparatus of claim 1, wherein said sound attenuating element is configured from a sound deadening plastic foam.

6. The backpack suction/blower apparatus of claim 5, wherein said plastic foam is an open-pore plastic foam in the form of a PUR foam.

7. A backpack suction/blower apparatus carried by an operator in a usual work position when said suction/blower apparatus is in operational use, said suction/blower apparatus comprising:
a blower unit including a drive motor, a blower driven by said drive motor and a blower tube extending out from said blower unit;
a back carrier frame;
means for supporting said blower unit on said frame at a spacing therefrom to form an intake gap;
said intake gap being filled with a sound attenuating element in a lateral direction referred to said usual work position;
said sound attenuating element being a first sound attenuating element;
said back carrier frame including a back plate having a side facing toward said blower unit;
a second sound attenuating element which lines said intake gap on said side of said back plate; and,
said second sound attenuating element including a sound protective cone leading into an intake opening of said blower unit and said sound protective cone being on said back plate.

8. The backpack suction/blower apparatus of claim 7, wherein said second sound attenuating element is held form tight on said back plate.

9. The backpack suction/blower apparatus of claim 7, wherein said apparatus further comprises an intake lattice and said second sound attenuating element is held by said intake lattice.

10. The backpack suction/blower apparatus of claim 9, wherein said apparatus further comprises holders for clamp holding said second sound attenuating element on said back plate.

11. The backpack suction/blower apparatus of claim 10, wherein said holders include holding clamps, projections and/or holding angles.

12. The backpack suction/blower apparatus of claim 11, wherein said holding angles include side holding angles and pins projecting from said back plate in the region of said side holding angles; and, said second sound attenuating element is pushed onto said pins.

13. A backpack suction/blower apparatus carried by an operator in a usual work position when said suction/blower apparatus is in operational use, said suction/blower apparatus comprising:
a blower unit including a drive motor, a blower driven by said drive motor and a blower tube extending out from said blower unit;
a back carrier frame;
means for supporting said blower unit on said frame at a spacing therefrom to form an intake gap;
said intake gap being filled with a sound attenuating element in a lateral direction referred to said usual work position; and,
a motor hood and an additional sound attenuating element being clamp held in said motor hood.

14. A backpack suction/blower apparatus carried by an operator in a usual work position when said suction/blower apparatus is in operational use, said suction/blower apparatus comprising:
a blower unit including a drive motor, a blower driven by said drive motor and a blower tube extending out from said blower unit;
a back carrier frame;
means for supporting said blower unit on said frame at a spacing therefrom to form an intake gap;
said intake gap being filled with a sound attenuating element in a lateral direction referred to said usual work position;
said blower tube having a radially widened section; and,
an additional sound attenuating element being held form tight in said radially widened section.

15. The backpack suction/blower apparatus of claim 14, wherein said additional sound attenuating element is configured as an elastic cylinder pressed into said radially widened section.

16. The backpack suction/blower apparatus of claim 15, wherein said cylinder is formed from a curved bent plate material connected along a seam.

17. The backpack suction/blower apparatus of claim 16, wherein said seam is welded or glued.

18. A backpack suction/blower apparatus carried by an operator in a usual work position when said suction/blower apparatus is in operational use, said suction/blower apparatus comprising:
a blower unit including a drive motor, a blower driven by said drive motor and a blower tube extending out from said blower unit;
a back carrier frame;
means for supporting said blower unit on said frame at a spacing therefrom to form an intake gap;
said intake gap being filled with a sound attenuating element in a lateral direction referred to said usual work position;
said drive motor including an exhaust-gas muffler; and,
an additional sound attenuating element being disposed in the spatial region of said exhaust-gas muffler.

19. The backpack suction/blower apparatus of claim 18, wherein said additional sound attenuating element is made of melamine resin foam.

* * * * *